April 23, 1968 D. R. ZACHARDA 3,380,037

BISTABLE DEVICE

Filed Dec. 27, 1963 2 Sheets-Sheet 1

INVENTOR.
DONALD R. ZACHARDA

BY Vincent L. Carney

ATTORNEY

April 23, 1968 D. R. ZACHARDA 3,380,037

BISTABLE DEVICE

Filed Dec. 27, 1963 2 Sheets-Sheet 2

INVENTOR.
DONALD R. ZACHARDA

BY Vincent L. Carney

ATTORNEY

United States Patent Office 3,380,037
Patented Apr. 23, 1968

3,380,037
BISTABLE DEVICE

Donald R. Zacharda, West Chester, Pa., assignor to Burroughs Corporation, Detroit, Mich., a corporation of Michigan Filed Dec. 27, 1963, Ser. No. 333,847
18 Claims. (Cl. 340—174)

ABSTRACT OF THE DISCLOSURE

A novel bistable device, and memory apparatus incorporating the same, including energy storage means electrically coupled to valve means which conducts during only a portion of the cycles of an AC voltage impressed across them as may be observed on an output terminal electrically connected between them.

This invention relates to bistable devices, and more particularly to bistable devices in which one phase of a periodic voltage is effective as one stable state and another phase of the same periodic voltage is effective as a second stable state.

Electronic apparatus which have two stable states have widespread application in the communication fields and in the computer fields. In these fields one of the stable states may be used to represent a binary "one" and the other stable state may be used to represent a binary "zero." Bistable devices are used to store information which is in the form of a code composed of these binary "one" and "zero" states.

Some bistable devices have one stable state that provides a voltage of one polarity and a second stable state which provides a voltage of the opposite polarity or, one stable state which is a voltage of one polarity and a second stable state which provides an output of ground potential. Information stored by such devices is said to be in the form of pulse script. Other bistable devices indicate two stable states by a comparison of the time in which a voltage pulse appears with respect to a central timing pulse. Such devices may provide a periodic voltage output in either of two phases with respect to this timing voltage source. Information stored by these devices is said to be in the form of phase script.

One type of device which is used to store phase script information is called the parametron. This device is comprised of a first tuned circuit, which is resonant at a pump frequency, a non-linear reactance that receives power from this first tuned circuit and varies its reactivity in accordance with it, and a second output tuned circuit, which is resonant at a frequency that is a sub-harmonic of the pump frequency. It can be seen that these elements are comprised of a relatively large number of discrete components to be basic storage elements. Accordingly, it is an object of this invention to provide a simplified element for the storage of phase script information.

It is a further object of this invention to provide a memory for phase script information in which the recorded signal is available at all times in the form of a unidirectional pulse.

It is a still further object of this invention to provide a bistable device which is relatively unaffected by heat and magnetic fields.

It is a still further object of this invention to provide a phase script memory which has short read-write intervals and which requires very little supporting circuitry.

In accordance with the above objects a bistable device is provided for use in a phase script memory. This bistable device comprises an inductor with one end connected to a source of alternating current and the other end connected to an output terminal and also the anode of a diode. The cathode of the diode is grounded.

In this circuit the diode operates as a self-actuated switch. A self-actuated switch is used in order to simplify the circuit so that it may be constructed cheaply and compactly. Separately actuated switches such as triode switches result in a more complex circuit.

The inductor in this circuit is used as an energy storing device. An inductor is used because it is inexpensive and easily fabricated. The energy stored by the inductor is proportional to the current that flows through the inductor squared. This current may be thought of as the resultant of two separate currents: one called a steady-state current and the other called a transient current. If a circuit composed of a source of power and inductance is unbroken, the steady-state current has the same waveform as the current of the source, which in this case is an alternating current. However, the steady-state current lags behind the voltage provided by the alternating current source by 90°. The transient term on the other hand, starts at a high value when the circuit is closed and falls exponentially until it is negligible.

In this embodiment of the invention the transient current is very large when it first starts. It then falls very rapidly so as to become insignificant in two cycles of the alternating current source. The starting value of the transient current is large because the inductance of the circuit is great as compared to its resistance and because the circuit is completed at a time when the voltage from the alternating current source is passing through a cross-over point.

As the voltage from the alternating current source passes through its cross-over point, and increases in a positive direction, current flows through the inductor and through the diode storing energy in the inductor. At first this current is only the transient current since the steady-state current lags behind the voltage by a quarter of a cycle. When the voltage from the alternating current power supply is at its positive peak, the steady-state current is starting. The resulting current through the inductor is composed of the sum of the transient current and the steady-state current.

When the voltage from the alternating current power supply passes through its negative half cycle, the energy stored in the inductor due to the transient current and the steady-state current continues to cause current to flow through the diode. However, the resulting current is reduced so as to reach a minimum at the cross-over point of the voltage from the alternating current source as it increases in a positive direction. The resultant current then increases reaching a maximum near the negative-going cross-over point of the voltage from the alternating current supply. The transient current has decreased greatly by this time so that the resulting current is composed mainly of the steady-state current.

The energy stored in the inductor due to this current is large enough to keep the diode conducting beyond the negative peak of the voltage from the alternating current source. However, the diode becomes reversed biased and switches the circuit to an open condition as the voltage from the alternating current supply increases through its cross-over point. This cross-over point corresponds in time with the projected minimum steady-state current. The above cycle repeats as the circuit is closed by the positive excursion of the voltage from the alternating current source.

It can be seen that a negative output voltage results each time the diode is turned off so as to open the circuit. These negative voltage pulses occur once for every two cycles of the alternating current source. As the voltage from the alternating current source increases in a positive direction towards its peak, a counter voltage is developed across the inductor of sufficient magnitude to hold the output terminal near ground potential. For the first cycle and a half, the voltage from the source of alternating current is dropped across the inductor. Then, as the voltage from the source of alternating current rises from its peak negative value towards ground level the voltage drop across the inductor falls and the voltage from the alternating current source is dropped across the diode. This is the voltage that appears at the output terminal. After the voltage waveform from the alternating current source has passed through its cross-over point, in the direction of its positive peak, the diode is again forward biased and the voltage drop is across the inductor so that there is no output voltage.

The bistable device may be activated by external energy so as to determine which one of the two cycles of the input AC current will correspond with the output unidirectional pulse. Once the phase of the output pulse has been determined by the source of external energy, it will retain this phase until disturbed again.

The invention and the above-noted and other features thereof will be understood more clearly and fully from the following detailed description with reference to the accompanying drawings in which.

Figure 1:
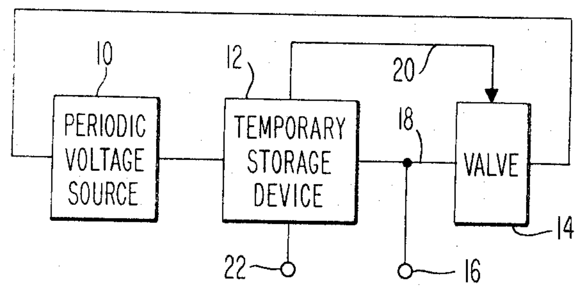
FIGURE 1 is a block diagram of an embodiment of the invention.

Referring now in particular to FIGURE 1, a block diagram of a bistable device embodying the present invention is shown, having a source of a periodic voltage 10, a device for temporarily storing electrical energy 12, and an electrical current valve 14. The source of a periodic voltage 10 is electrically connected to the temporary storage device 12 so as to provide electrical energy to it. The output terminal 16 and the valve 14 are electrically connected to the other end of the temporary storage device 12; the valve 14 is electrically connected to the energy storage device 12 by a conductor 18 through which it receives electrical energy and through a conductor 20 through which it receives a controlling voltage.

The periodic voltage source 10 applies energy to the temporary storage device 12. The energy from the temporary storage device 12 is emptied through the valve 14 by way of conductor 18. The temporary storage device 12 also provides a controlling voltage to open the valve 14 through conductor 20. A control terminal 22 is electrically connected to the storage device 12.

Figure 2:
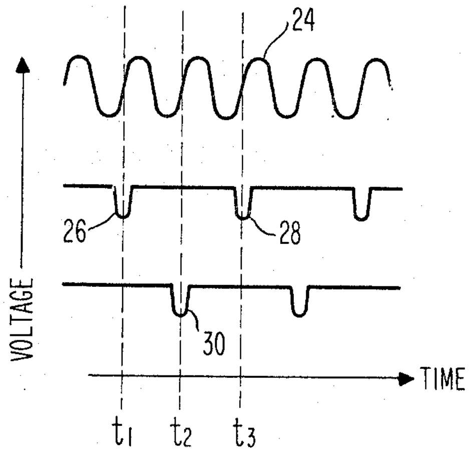
FIGURE 2 is a graph showing curves of voltage waveforms taken at different points on the block diagram of FIGURE 1.

Referring now to FIGURE 2, a graph is shown of the voltage waveforms from the periodic voltage source 10 and of the voltage waveforms of two of the possible output voltages from terminal 16 indicating the two possible states of the bistable device. Each of these waveforms have a common abscissa of time and individual ordinates of voltage. The curve 24 shows sinusoidal voltage output from the periodic voltage source 10. This voltage is applied to the temporary storage device 12. The pulses 26 and 28 represent one of the possible output phases and the negative voltage pulse 30 represents the alternate output phase. These pulses appear at terminal 16.

At the time $t_1$ a negative voltage pulse is applied to terminal 22 so as to withdraw energy from the temporary storage device 12. This causes the valve 14 to be turned off and a voltage pulse 26, shown underneath the curve 24 of FIGURE 2, to appear at terminal 16. The pulse 26 is centered around the positive going cross-over point of the sinusoidal voltage 24. The periodic voltage source 10 continues to provide electrical energy to the temporary storage device 12. This energy turns the valve 14 back on. Energy is now drained from the temporary storage device 12 at a slow rate. At the end of two cycles of the sinusoidal voltage 24, the energy in the temporary storage device 12 has dropped to such a low value that the valve 14 is again closed. This causes the negative voltage from the periodic voltage source 10 to be dropped across the valve so as to appear as the voltage pulse 28 under a positive-rising crossover point shown in the curve 24. The voltage pulses 26 and 28 continue to appear at the terminal 16 for an indefinite period of time maintaining the same phase relationship.

However, if the negative pulse at terminal 22 were to be applied one cycle later at time $t_3$, the valve 14 would be closed at this time so as to provide the negative output pulse 30 at terminal 16. The pulse 30 is shown one cycle later than the pulse 26 in the graph of FIGURE 2. This pulse is repeated every two cycles of the periodic voltage source 24 so as to provide an output that is out of phase with the pulses 26 and 28 by one cycle of the input voltage 24.

Figure 3:
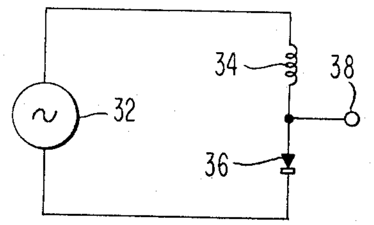
FIGURE 3 is a schematic circuit diagram of an embodiment of the invention.

Referring now in particular to FIGURE 3, a schematic circuit diagram of a bistable device according to the invention is shown having a source of sinusoidal voltage 32, an inductor 34, a diode 36 and an output terminal 38. One end of the inductor 34 is connected to one output terminal of the source of sinusoidal voltage 32; the other end of the inductor 34 is electrically connected to the output terminal 38 and to the anode of diode 36. The cathode of the diode 36 is electrically connected to the other output terminal of the source of sinusoidal voltage 32.

The source of sinusoidal voltage 32 serves the same function as the periodic voltage source 10 of FIGURE 1 and may provide an output of 12 volts peak-to-peak at a frequency between 3 to 9 megacycles. The inductor 34 serves the same function as the temporary storage device 12 in FIGURE 1 and may have a value of inductance of approximately 15 microhenries. The diode 36 serves the same function as the valve 14 in FIGURE 1 and may be of the type IN270 germanium junction. The output terminal 38 serves the same function as the output terminals 16 and also the terminal 22 of FIGURE 1. That is, if terminal 38 is influenced momentarily by the signal from a source which has a lower output impedance than the input impedance of the bistable device at terminal 38, the bistable circuit will assume the same phase as the lower impedance signal thereafter.

As the voltage from the source 32 goes positive from zero volts, the diode 38 switches on so as to place the inductor 34 directly across the source of voltage 32. The inductor 34 begins to store energy that it receives from the source 32 in the form of a current. The amount of energy stored is equal to one-half of the product of the inductance of the coil times the square of the current through the coil. The current through the coil which will hereinafter be called the resulting current, may be considered as the sum of two other currents hereafter called the transient current and the steady-state current.

Tht transient current starts at a high positive value as soon as the switch 36 is closed and decreases to a negligible value. The steady-state current lags a quarter of a cycle behind the voltage from the source 32 so that it starts at zero value 90° later and thereafter follows the same waveform displaced by a quarter of a cycle. Approximate wave shapes of these two currents may be found in FIGURE 9, on page 561 of the book entitled "Alternating Current Circuits," third edition, by Russel M. Kerchner and George F. Corcoran, published by John Wiley and Sons, Inc., London. This book also provides the theoretical equations for these two currents. From these equations it can be seen that the transient current will start very large and decrease rapidly in a circuit in which the inductance is high and the resistance is low. This is the case in the circuit of FIGURE 3.

The resulting current in the inductor 34 begins to rise during the time of the cross-over of the positive-going voltage from the source 32. It raises to a maximum value near the time of the negative-going cross-over point of the voltage from the source 32 since the steady-state current has its peak value at this point which is 90° later than the peak voltage of the source, and then it decreases so as to reach a minimum at the time of the positive-going cross-over point of the cycle from the source 32. The diode 36 remains forward biased throughout this period of time. The resulting current in the inductor 34 begins to rise again at the time of the cross-over point of the succeeding cycle of the voltage source 32 due to the periodic nature of the steady-state current, but does not reach as large a value as it did in the preceding cycle because the transient current has decreased. However, enough energy remains in the inductor 34 to keep current flowing through the diode 36 through the next negative peak of the voltage from the source 32. However, as the voltage from the source 32 passes through its next positive going cross-over point, the diode 36 becomes reverse biased since the transient current has fallen to a low value and the lagging steady-state current is at a negative minimum. The voltage from the periodic voltage source 32 is now dropped across the diode 36 so as to appear at the output terminal 38. This process is repeated so that a negative pulse is provided at the terminal 38 once for every two cycles of the voltage from the source 32. Of course if the diode 36 were reversed, a positive pulse would be provided at the terminal 38 once for every two cycles of the voltage from the source 32.

A negative output voltage of approximately 5.4 volts peak-to-peak will appear at terminal 38 once for every two cycles of the alternating voltage from the source 32. This output pulse continues as a stable oscillation of one of two phases. The phase can be determined by coupling a lower impedance signal momentarily to terminal 38. The output at terminal 38 assumes the same phase as this lower impedance signal and continues after the lower impedance signal is removed.

Approximately two milliamperes are drawn from the source of alternating voltage 32. Since a twelve volt peak-to-peak voltage supply operating at between 3 to 9 megacycles is saisfactory, a single generator could supply a great many units. For example, one transistor supplying only one ampere could furnish excitation for five hundred such units. Positive output signals may be obtained by reversing the diode 36 in FIGURE 3.

Figure 4:
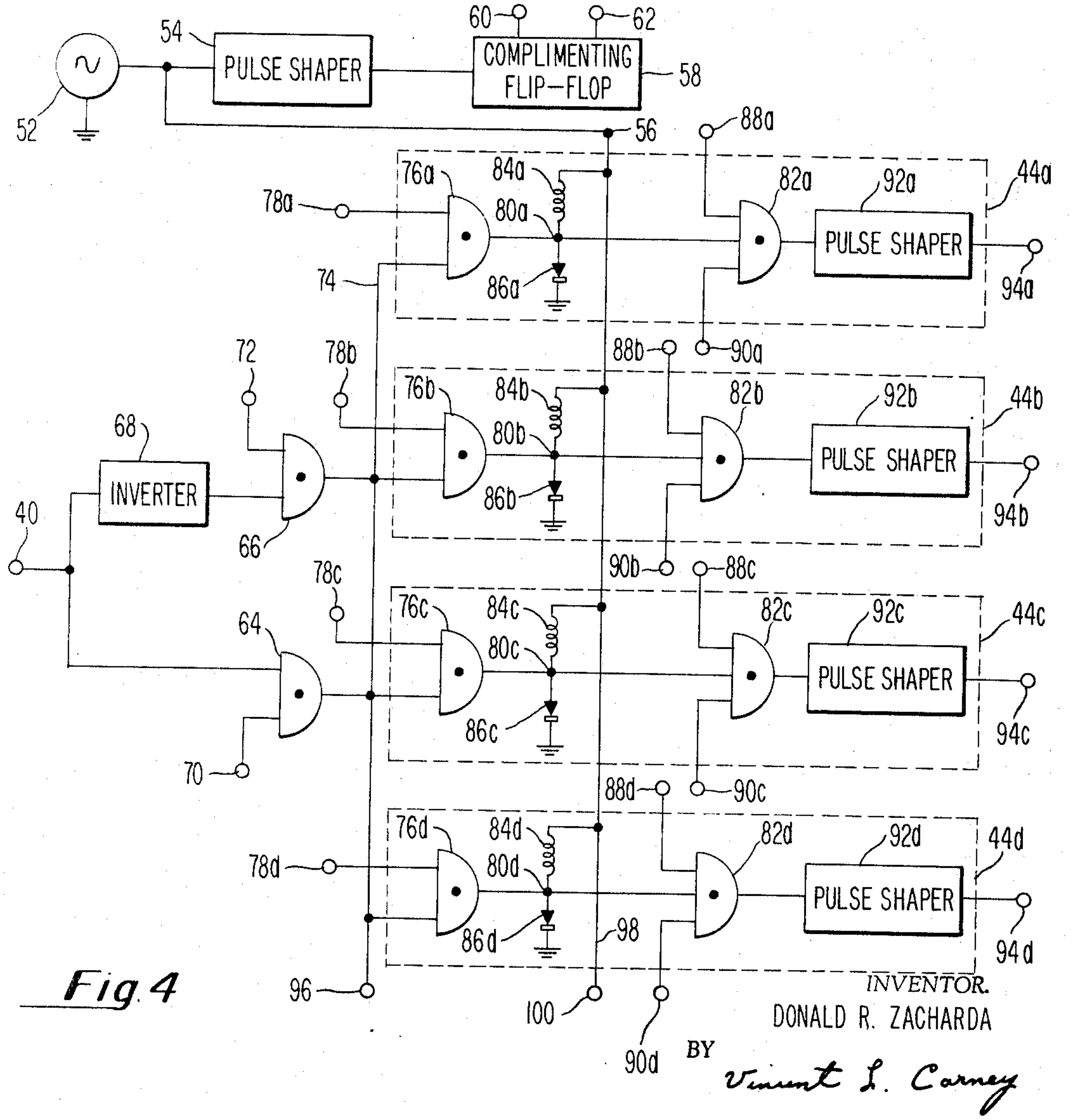
FIGURE 4 is an embodiment of a memory utilizing the bistable device of the invention.

A memory utilizing the bistable devices of this invention is shown in FIGURE 4 having an input terminal 40 and four memory elements indicated generally at 44*a*–44*d*. A source of AC voltage 52 is electrically connected to the pulse shaper 54 and to terminal 56. The pulse shaper 54 is electrically connected to the complementing flip-flop 58 which has output terminals 60 and 62.

The pulse shaper 54 and the complementing flip-flop 58 establish a reference phase to which each bit of information (output from the phase script memory element) can be compared. The output terminal 60 of flip-flop 58 provides pulses of one phase which are considered as binary "ones" and output terminal 62 of the flip-flop 58 provides pulses of the other phase which are considered as binary "zeros." The complementing flip-flop 58 is switched from one state to the other by each cycle from the generator 52 after the cycle has been passed through the pulse shaper 54 so as to provide a proper switching pulse. Since the source 52 is also used to supply the input power to each memory element, the references from the outputs of the flip-flop 58 will always be synchronized with the outputs of the memory elements.

The input terminal 40 is connected directly to one input of AND gate 64 and to one input of AND gate 66 through the inverter 68. Terminal 70 is connected to a second input of AND gate 64 and also to terminal 60 of the complementing flip-flop 58; terminal 72 is connected to a second input of AND gate 66 and also to terminal 62 of the complementing flip-flop 58. The outputs of both AND gate 64 and AND gate 66 are connected to the conductor 74.

A negative voltage pulse (one bit of information in a negative logic system) applied to terminal 40 in pulse script form is converted to a phase script form and applied to conductor 74. If the pulse has a negative amplitude, it is inverted by the inverter 68 and applied to the AND gate 66 as a positive value; if it is of opposite polarity, it is inverted by the inverter 68 so as to appear as a negative pulse at the AND gate 66. The gate 66 also receives pulses from terminal 72 generated by the complementing flip-flop 58. These pulses are timed so as to be the binary "zero" phase. Consequently, a positive pulse applied to terminal 40 will act in conjunction with a pulse on terminal 72 so as to provide pulses on conductor 74 which are in the binary "zero" phase. A negative pulse will cause the gate 66 to remain closed.

On the other hand, positive and negative pulses are conducted directly to the gate 64 from the terminal 40. The terminal 70 of the gate 64 receives pulses from the flip-flop 58 which are in the binary "one" phase. Consequently, a positive pulse applied to terminal 40 will cause the gate 64 to be opened when a pulse is applied at terminal 70 so as to result in a pulse on conductor 74 which is in the binary "one" phase. A negative pulse applied to terminal 40 will cause the gate 64 to remain closed.

Each of the memory elements 44*a*–44*d* includes one of the four AND gates 76*a*–76*d*. Each of the AND gates 76*a*–76*d* has one of its two input terminals electrically connected to conductor 74 and has a second input electrically connected to a corresponding one of the selection terminals 78*a*–78*d*. Each one of four terminals 80*a*–80*d* is electrically connected to a corresponding one of the output terminals of the four gates 76*a*–76*d*, to an input terminal of a corresponding one of the four AND gates 82*a*–82*d*, to one end of a corresponding one of the four inductors 84*a*–84*d*, and to the anode of a corresponding one of the four diodes 86*a*–86*d*. The other end of each of the inductors 84*a*–84*d* is electrically connected to the terminal 56 which is connected in turn to one output terminal of the AC source 52; the cathodes of each of the four diodes 86*a*–86*d* are electrically connected to the other output terminal of the AC source 52.

Each of the four AND gates 82*a*–82*d* has three inputs: the first one being electrically connected to a corresponding one of the four interrogate terminals 88*a*–88*d*, the second one being electrically connected to a corresponding one of the four terminals 80*a*–80*d*, and a third one being electrically connected to a corresponding one of the four binary "one" reference terminals 90*a*–90*d*, which are in turn electrically connected to terminal 60 of the flip-flop 58. Each of the four pulse shapers 92*a*–92*d* has its input electrically connected to the output of a corresponding one of the four AND gates 82*a*–82*d* and has its output electrically connected to a corresponding one of the four output terminals 94*a*–94*d*. Other memory elements may be added to the memory of FIGURE 4 by connecting them to conductor 74 at terminal 96 and to terminal 56 through conductor 98, which connects terminal 56 to terminal 100.

The phase script information which has been read into conductor 74 by the input unit may be recorded in any one of the four memory elements 44*a*–44*d*. If it is desired to record this information into the memory element 44*a*, for example, the corresponding selection terminal 78*a* is pulsed with a negative voltage. The AND gate 76*a* is thereby opened to the voltage pulses on 74*a* which form the bit of phase script information. The negative pulses forming this bit of information are conducted to terminal 80*a* between the inductor 84*a* and the diode 86*a*. Since a sinusoidal AC voltage is impressed across the series combination of the inductor 84*a* and the diode 86*a* by the source of AC voltage 52, this unit generates a series of negative pulses at terminal 80$a$ which has the same phase relation as the information read into the terminal from conductor 74 through the AND gate 76$a$. These pulses continue even after the bit of phase script information from conductor 74 has been terminated.

At any later time, if it is desired to read the bit of phase script information out of the memory element 44$a$, the corresponding interrogate terminal 88$a$ is pulsed by a positive voltage. If the bit of phase script information is in the form of a binary "zero" the AND gate 82$a$ remains closed. This is because the one of the input terminals of the gate 82$a$ that is connected to terminal 80$a$ receives pulses synchronized in time with the binary "zero" bit and another input terminal that is electrically connected to terminal 90$a$ receives pulses synchronized in time with the binary "one" from the output terminal 60 of the flip-flop 58. Since these two inputs to the AND gate 82 never coincide in time, the gate 82 will always remain closed.

However, if the phase script information recorded in the memory element 44 is a binary "one" bit, the AND gate 82$a$ is opened by the concurrence of pulses of the interrogate terminal 88$a$, terminal 80$a$, and terminal 90$a$. In this case a voltage pulse is passed to the pulse shaper 92$a$, which may be a one-shot multivibrator. The pulse shaper provides a somewhat longer output pulse to the output terminal 94$a$. It can be seen that a voltage output is only read to the terminal 94$a$ if a binary "one" bit has been recorded in the memory element 44$a$; otherwise a "zero" voltage level is read to the terminal 94$a$. The terminal 94$a$ then receives the information recorded in the memory element in pulse script form.

Figure 5:
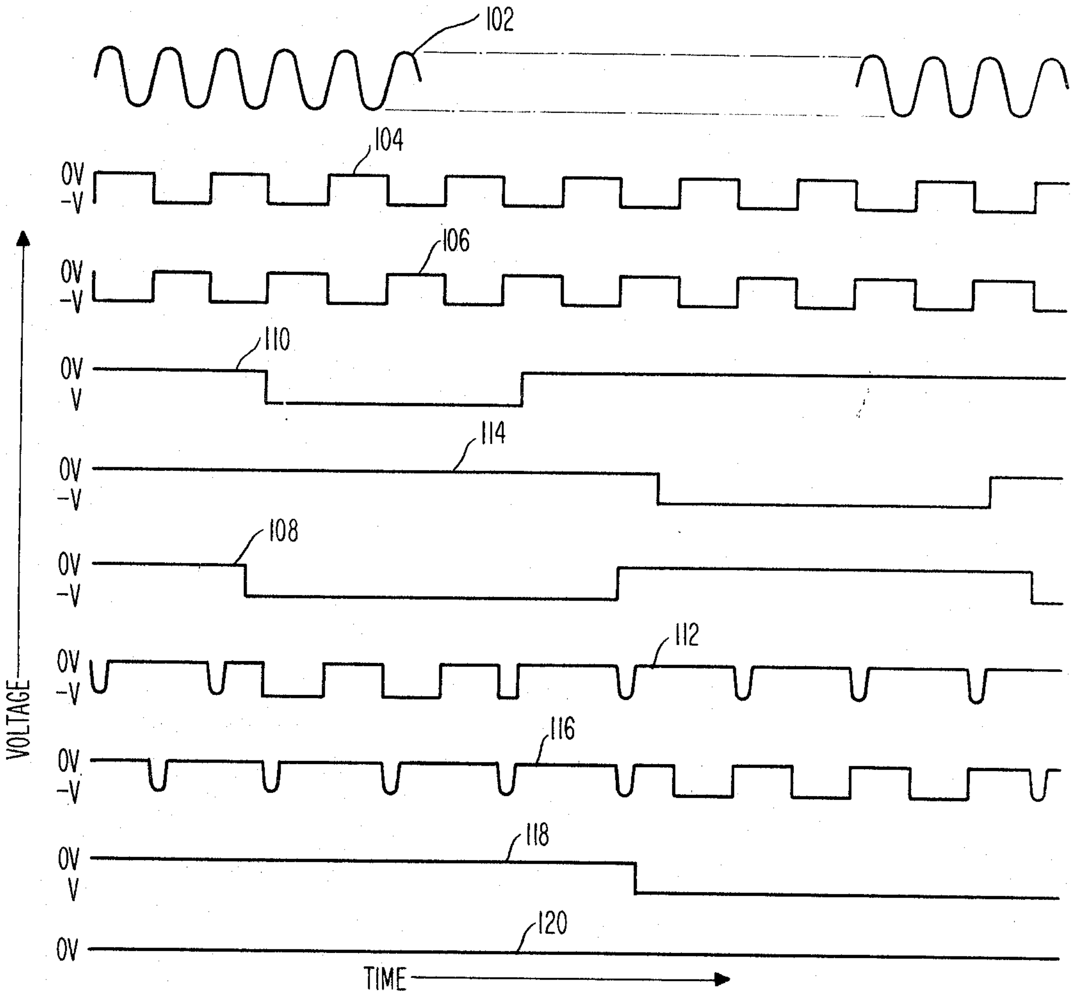
FIGURE 5 is a graph of voltage waveforms taken at various points in the circuit of FIGURE 4.

In FIGURE 5, a graph is provided having a plurality of curves, one under the other, so as to share the same abscissas but to have individual ordinates. The ordinates are voltage and the abscissas are time. Each curve represents a voltage waveform from a different location in the circuit of FIGURE 4.

The top curve 102 illustrates the sinusoidal voltage generated by the source 52 in FIGURE 4. This sinusoidal voltage is applied to each memory element and also to the pulse shaper 54. The pulse shaper 54, which may for example be an RC differentiating network, triggers the complementary flip-flop 58 on each cycle. This causes a waveform such as that shown in curve 104 to appear at terminal 60 and a waveform such as that shown in curve 106 to appear at terminal 62. It can be seen that the waveform 104 and the waveform 106 are in the form of alternate negative going voltage pulses. The curve 104 represents a reference for a binary "one" and the curve 106 represents a binary "zero.") The voltage waveform 104 is applied to terminal 70 and the voltage waveform 106 is applied to terminal 72.

If it is desired to record the two bits of information shown in pulse script form in the curve 108 with the first bit which is a negative pulse recorded in memory element 44$a$ and with the second bit which is a ground level voltage pulse recorded in the memory element 44$b$, the terminal 78$a$ of the memory element 44$a$ is pulsed concurrently with the first bit shown in the curve 108 and terminal 78$b$ of the memory element 44$b$ is pulsed concurrently with the second bit of information in the curve 108. Since the first bit of information in curve 108 is a negative voltage pulse, it causes the gate 64 to be opened in phase with pulses of curve 104 so as to provide a series of negative voltages on conductor 74 which series is in phase with the binary "one" reference. The second bit of information shown in curve 108 is inverted by the inverter 68 and causes gate 66 to be opened in sychchronism with the pulses shown in curve 106 so as to provide a binary "zero" to conductor 74.

When the selection pulse 110 is applied to terminal 78$a$ of the memory element 44$a$, the AND gate 76$a$ is opened so as to impress the binary "one" voltage pulses on the terminal 80$a$. This results in a continuous series of pulses shown in curve 112, which pulses are in synchronism with the reference pulses of a binary "one." When the selection voltage 114 is applied to the terminal 78$b$ of the memory element 44$b$, the negative AND gate 76 is opened so as to provide a series of pulses to terminal 80$b$ which is in synchronism with the binary "zero" voltage shown in curve 106. This results in a continuous voltage output at terminal 80$b$ which is in synchronism with the reference binary "zero" as shown in curve 116.

To read the information out of the memory elements 44$a$ and 44$b$, pulses are applied to the interrogate terminals 88$a$ and 88$b$ respectively. If at some time after the beginning of the second bit of information shown in curve 108, negative interrogate pulses are applied to both terminals 88$a$ and 88$b$, a negative voltage pulse shown in curve 118 is provided to terminal 94$a$ of the memory element 44$a$ and "zero" voltage shown in curve 120 is provided to output terminal 94$b$ of the memory element 44$b$.

The negative pulse shown by curve 118 is the output of pulse shaper 92$a$, which is triggered on by the concurrence of the interrogate pulse applied at terminal 88$a$, the binary "one" bit of information from terminal 80$a$, and the reference binary "one" bit of information from terminal 90$a$. The concurrence of these three pulses open gate 82$a$ to trigger on the pulse shaper 92$a$. Ground potential is attained at the output terminal 94$b$ as shown in curve 120 since the binary "zero" information at terminal 80$b$ does not concur in time with the reference binary "one" voltage at terminal 90$b$. Therefore, the negative AND gate 82$b$ is not open.

It can be seen that the embodiment of this invention provides a simple inexpensive bistable device which requires very little supporting circuitry. It provides a unidirectional pulse output in either of two stable states and may be used with transistors in computer elements such as memories and logic circuitry. It provides a clear, discernable signal which is relatively unaffected by heat and magnetic fields. When used as a memory element, it provides a permanent output and can be utilized with very short input and output read-write intervals.

Obviously, many modifications and variations of the present invention are possible in the light of the above teachings. It is therefore to be understood that within the scope of the appended claims the invention may be practiced otherwise than as specifically described.

What is claimed is:

1. The combination comprising:

first and second input terminals adapted to have an AC voltage impressed across themselves;

storage means, electrically connected to said first input terminal, for temporarily storing electrical energy and producing a bias from said AC voltage for a period longer than that of said AC voltage;

valve means, electrically connected to said storage means, and to said second input terminal, for blocking the conduction of electrical current in at least one direction during only selected cycles of said AC voltage under bias control by the storage means; and an output terminal electrically connected between said valve means and said storage means for indicating the portion of the cycles of said AC voltage during which the valve means blocks current in said one direction.

2. A bistable device comprising:

first and second input terminals adapted to receive an AC voltage between themselves;

storage means for temporarily storing electrical energy received from said AC voltage, producing a control bias persisting for a period longer than that of said AC voltage and terminating upon the release of the stored energy;

unidirectional conducting means, electrically connected to said storage means, for blocking the passage of electrical current during a substantial portion of each alternate cycle of said AC voltage responsive to the release of energy by the storage means; and an output terminal connected between said storage means and said unidirectional means.

3. A bistable device according to claim 2 in which said storage means comprises an inductor electrically connected in series with said unidirectional means.

4. A bistable device according to claim 3 in which said unidirectional means comprises a diode.

5. A bistable device comprising:

an AC voltage means for generating an AC voltage;

reactive means, electrically connected to one output terminal of said AC voltage means, for temporarily storing electrical energy from said AC voltage and producing a bias for a period greater than, but less than twice, that of said AC voltage;

unidirectional means, electrically connected to said reactance means and to the other output terminal of said AC voltage means, for providing a non-linear, directional resistance to electrical current; and an output terminal connected between said reactance means and said unidirectional means providing a unidirectional output voltage signal pulse once for every two cycles of said AC voltage under bias control by the reactive means;

the frequency and the amplitude of said AC voltage being insufficient to cause conduction of said unidirectional means across two consecutive full cycles of said AC voltage.

6. A bistable device according to claim 5 in which said unidirectional means comprises a semiconductor diode.

7. A bistable device according to claim 6 in which said reactance means comprises an inductance electrically connected in series between one output terminal of said AC voltage means and said semiconductor diode.

8. A bistable device according to claim 7 in which said output terminal is electrically connected to the anode of said semiconductor diode, whereby said unidirectional pulses are negative-going.

9. The combination comprising:

an input terminal adapted to receive an AC voltage;

a ground terminal;

an output terminal;

unidirectional means, electrically connected between said output terminal and said ground terminal, for shorting said output terminal to ground when forward biased and for providing an output voltage when reversed biased; and reactive means, electrically connected to said input terminal and to said unidirectional means, for generating a transient bias voltage each time said unidirectional means stops conducting of sufficient magnitude and duration to prevent said unidirectional means from being reverse-biased again for two cycles of said AC voltage.

10. The combination according to claim 9 in which said unidirectional means comprises a semiconductor diode; said output terminal is adapted to receive conduction phase control signals; and said reactive means comprises an inductor.

11. A memory element for recording a pulse of a first polarity in the form of a series of pulses having a first phase and for recording the pulse of a second polarity in the form of a series of pulses having a second phase, comprising:

first and second power input terminals adapted to have an AC voltage impressed across themselves;

a complementing flip-flop having its input terminal electrically connected to said first power input terminal and having a first output terminal for providing a series of pulses of said first phase, and a second output terminal for providing pulses of said second phase;

first and second input AND gates each having a first and second input and an output;

an output AND gate having three inputs and one output;

one of said inputs of said first input gate and one of said inputs of said output gate being electrically connected to said second output of said flip-flop, whereby said first input gate and said output gate are only opened in time sequence with said series of pulses of said second phase;

one of said inputs of said second input gate being electrically connected to said first output of said flip-flop whereby said second input gate is only opened in time sequence with pulses of said first phase;

an inductor having a first end electrically connected to said first power input terminal and having a second end electrically connected to the outputs of said first and second input gates and to an input of said output gate;

a diode having its anode electrically connected to said second end of said inductor and having its cathode electrically connected to said second power input terminal; and an inverter electrically connected to the other input of said second input gate;

said inverter and said other input of said first input gate each being electrically connected to an input terminal for said memory element, whereby an input pulse of said first polarity causes a series of pulses of said second phase to appear at the second end of said inductor and an input pulse of said second polarity causes a series of pulses of said second phase to appear at said second end of said inductor;

said third input terminal of said output gate being adapted to receive an interrogate pulse whereby a sequence of pulses having said second phase may be read from said second end of said inductor to the output of said memory element and the sequence of pulses in said first phase will be blocked by said output means.

12. A memory comprising:

means for providing reference output voltages having a first phase at a first terminal and for providing reference output voltages having a second phase at a second terminal;

input gating means having an input terminal and an output terminal for providing pulses of said first phase to said output terminal while receiving a pulse of a first polarity on said input terminal and providing pulses of said second phase to said second output terminal while receiving pulses of a second polarity on said input terminal;

a plurality of selection means electrically connected to said input gating means for passing said series of voltages of either phase from said output terminal of said input gating means while receiving a selection pulse;

a plurality of memory elements;

each of said memory elements being electrically connected to a corresponding one of said selection means, for receiving pulses of either phase from said selection means and for continuously generating pulses of the same phase;

each of said memory elements being characterized by having an inductor and a diode electrically connected in series across a source of AC voltages and by having its input and its output electrically connected between said inductor and said diode; and a plurality of output gates electrically connected to said reference means and to said memory elements for providing an output voltage of said first polarity while receiving pulses of said first phase from said memory element concurrently with an interrogation pulse.

13. A memory according to claim 12 in which said output gating means each comprises an AND gate having three inputs: one of which is electrically connected to an interrogation input terminal, one of which is electrically connected to the output of one of said memory elements, and one of which is electrically connected to the output of said reference means which provides pulses of said first phase.

14. A memory according to claim 13 in which each of said selection means comprises an AND gate having two inputs one of which is electrically connected to the output of said input gating means and the other of which is electrically connected to a selection terminal.

15. A memory according to claim 14 in which said input gating means comprises:

a first AND gate having its output electrically connected to one input of each of said selection means, having one input electrically connected to the output of said reference means which provides said series of voltages of said first phase, and having its other input electrically connected to said input terminal of said input gating means; and a second AND gate having its output electrically connected to one input of each of said selection means, having one input electrically connected to the output of said reference means which provides said pulses of said second phase, and having its other input electrically connected to the output of an inverter;

the input of said inverter being electrically connected to said input terminal of said input gating means.

16. A memory according to claim 15 in which said reference means comprises a complementing flip-flop having its input electrically connected to said source of AC voltage.

17. The combination comprising:

first and second input terminals adapted to receive an AC voltage;

storage means, electrically connected to said first input terminal for temporarily storing electrical energy received from the source of said AC voltage;

valve means electrically connected to the storage means and to the second input terminal for substantially blocking electrical current in at least one direction during only selected ones of the cycles of said AC voltage; and a conduction control terminal electrically connected between said valve means and said storage means for receiving phase control signals selecting the portion of the cycles of said AC voltage during which the valve means passes current.

18. The combination of claim 17 wherein the conduction control terminal receives control potential from the storage means and also is adapted to receive external conduction phase control signals.

References Cited

UNITED STATES PATENTS

| | | | |
|---|---|---|---|
| 2,829,282 | 4/1958 | Hughes et al. | 307—107 |
| 3,210,734 | 10/1965 | Andrews et al. | 340—172 |

TERRELL W. FEARS, *Primary Examiner.*

R. MORGANSTERN, *Assistant Examiner.*